United States Patent [19]

Lunenschloss

[11] Patent Number: 5,248,391
[45] Date of Patent: Sep. 28, 1993

[54] OIL ABSORBENT MATERIAL
[75] Inventor: Ed V. Lunenschloss, Encino, Calif.
[73] Assignee: OSA Oil Scavenger Absorbent, Los Angeles, Calif.
[21] Appl. No.: 942,858
[22] Filed: Sep. 10, 1992
[51] Int. Cl.⁵ .................... D21F 13/00; D02F 1/28
[52] U.S. Cl. .............................. 162/218; 162/4; 162/135; 162/179; 162/189; 162/168.1; 210/924; 210/691
[58] Field of Search ............... 162/4, 179, 168.1, 147, 162/135, 218, 224, 989, 222, 231, 5; 210/924, 693, 691; 119/172

[56] References Cited
U.S. PATENT DOCUMENTS
4,519,918  5/1985  Ericsson et al. .................. 210/924

FOREIGN PATENT DOCUMENTS
767980  11/1971  Belgium .............................. 210/924
2358808  6/1975  Fed. Rep. of Germany ...... 210/924

Primary Examiner—W. Gary Jones
Assistant Examiner—Brenda A. Lamb
Attorney, Agent, or Firm—George J. Netter

[57] ABSTRACT

An oil absorbent, water non-absorbent material is made by boiling unglazed newsprint for a prescribed period of time, removing the slurry from the excess water, and baking until a dried solid cake remains. The solid dried cake is then saturated with linseed oil following which it is treated with hydrolyzed polyvinyl alcohol, baked to a dry solid, and reduced to convenient particle size.

16 Claims, No Drawings

OIL ABSORBENT MATERIAL

BACKGROUND

1. Field of the Invention

The present invention relates generally to an absorbent material and, more particularly, to such an absorbent material which readily absorbs oil but not water or aqueous solutions.

2. Description of Related Art

Various materials in the past have been found useful for absorbing oil, one of which includes organic fibers for trapping the oil in the interstices formed between the fibers. However, these known materials in addition to absorbing oil also have the undesirable capacity for absorbing water or other aqueous solutions which reduces the oil absorption efficiency. For example, in the case of catastrophic oil spills, a substantial proportion of the oil is to be found floating on the surface of a body of water and attempted absorption to remove the oil by a medium must contend with the possibility of the medium becoming thoroughly charged with water and, therefore, not able to efficiently absorb oil.

It is therefore a desideratum to provide a material which will efficiently absorb oil while at the same time exclude water and, in that way, maintain the oil absorption efficiency at a high level.

Moreover, a satisfactory material for removing oil from the surface of a body of water, should desirably have sufficient buoyancy so as not to sink below the water surface and thereby lose contact with the oil layer and, thus, lose the ability to further absorb the oil.

SUMMARY OF THE INVENTION

In accordance with the present invention, an oil absorbent and water non-absorbent material is provided which can be made in any of a number of different sized forms ranging from relatively small particles to large sized clumps or cakes. Also, the absorbent material has a suitable density enabling it to float on the surface of water and thereby remain in contact with any oil layer present and which is desired to be absorbed and removed. Still further, the material even when fully charged with absorbed oil is sufficiently buoyant to float on water which makes it easy to remove.

The oil absorbent material of this invention is compounded by first shredding non-glaze newsprint into relatively small pieces separated from one another. The newsprint pieces are then placed in a quantity of boiling water, a few pieces at a time, while continuously stirring the mixture to keep the pieces separated from one another. After boiling a prescribed length of time, not exceeding about one-half hour, the fibers become broken down and the ink and residue occurring in the newsprint can be floated off or skimmed. The resulting mixture is beat with an electric beater, for example, until a mush-like or viscous consistency is obtained after which the viscous mixture is removed leaving a remainder of the water quantity. The resulting material slush or slurry is then spread evenly onto a large sheet-like surface or shallow container with an open top which is placed in an oven where it is baked to form a dry cake.

The baked material is then saturated with linseed oil after which there is a further saturation with an alcohol surfactant. Following this, the saturated material is then blended in a mixer where it is broken up into relatively fine pieces which are once again laid onto a flat sheet-like surface and baked in an oven. The final baked material has the desired combination properties of being a highly efficient absorber of oil while, at the same time, being hydrophobic in not absorbing aqueous solutions. The material as it comes from the final baking step is in the form of a large sheet which can then be broken up either by machine beater or grinder, for example, to smaller sized pieces as desired.

In use, when the absorbent material of this invention is brought into contact with a quantity of oil it has been found to rapidly and efficiently absorb the oil after which the charged material can then be removed for storage or destruction at a convenient location. Where there has been a very large accumulation of oil on the surface of a body of water, for example, although the absorbent material may be administered directly on top of the floating oil, it has been found more efficient to release the absorbent material underneath the oil layer (i.e., directly into the water) and because of the material's buoyancy it will float upwardly for ultimate location within the body of oil. This action obviates the tendency for the absorbent material to merely float on the upper surface of the oil layer which would reduce the absorption efficiency by reducing the oil contacting area of the absorbent material.

DESCRIPTION OF A PREFERRED EMBODIMENT

A basic constituent of the absorbent material to be described is ordinary unglazed newsprint consisting essentially of organic fibrous paper which is typically imprinted primarily with black ink. It is important for present purposes that this newsprint not have a glazing on it since the presence of glaze on the finished material has been found to significantly reduce absorption efficiency. Since glaze is difficult and costly to remove from newsprint, it is more cost productive to use only unglazed newsprint as the raw material.

As a first step, the newsprint is torn or cut into relatively small individual pieces measuring approximately 2 inches by 3 inches, for example. However, it is important to note that the newsprint should be separated into individual sheets before cutting/tearing and not cut into pieces that effectively consist of multiple sheets of the newsprint sandwiched together.

Next, a quantity of water in an open top container is brought to a boil, the amount of water being sufficient to handle the amount of newsprint pieces that have been prepared and to cover them liberally. The newsprint pieces are added to the boiling water a few at a time while stirring constantly to keep the pieces separated and insure full immersion within the water. Cooking of the newsprint in the boiling water is continued until the fibers are broken down and ink and other residue is floated off. This cooking continues for approximately one-half hour (0.5 hours) during which time the stirring is continued.

At the conclusion of the boiling step, excess water is discarded and the remaining highly viscous, mush-like material or slurry is spread evenly in a layer approximately 0.25 inches thick onto a shallow, open top pan. The pan and material are inserted into an oven where it is cooked at 250° F. for approximately one hour. The resulting cake-like material on test has been found to be highly absorbent of both oil and aqueous solutions.

To provide the initially prepared baked absorbent material with the desired water exclusion properties, it is first treated with linseed oil (which may be poured or brushed onto the sheet of material after it has been removed from the oven) in sufficient quantity so as to saturate the entire material sheet. Following the oil saturation, the absorbent sheet is then saturated with fully hydrolyzed polyvinyl alcohol. Following the alcohol treatment the material sheet is blended in a mixer to break up the absorbent material into convenient sized pieces which are then spread out onto a shallow open top container similar to the one used in the earlier heating step and baked dry at approximately 250° F. for about 1 hour. The resulting material is a solid substance in the general shape of a large pancake, for example. For ultimate use, the material may be broken up into convenient sized smaller pieces by either machine beating or grinding.

In a specific example of the method for making the absorbent material of this invention, a one gallon open-top container was provided into which ten sheets of typical black-ink newsprint (30 inches×22½ inches), torn into pieces approximately 2 inches by 3 inches, were placed. A further two gallon open-top pan was approximately half filled with water and brought to a boil. The newsprint pieces were then added to the boiling water a few at a time and boiling was continued for about 0.5 of an hour accompanied by constant stirring which effected complete fiber breakdown of the newsprint. The major part of the ink and residue was floated off. At the conclusion of the boiling step, the newsprint was beat with a motor driven beater until the material achieved a mush-like or slurry consistency. The excess water was poured off and after forming the now highly viscous newsprint material into a thin layer (e.g., 0.25 inches thick) on a metal sheet, it was heated at 250° F. for about 1 hour to form a solid member shaped very much like a large pancake.

Waterproofing of the baked solid sheet of material was accomplished by pouring onto and over the material ("pancake") a sufficient quantity of linseed oil to effect saturation. Immediately following this, the absorbent material sheet was saturated by pouring fully hydrolyzed polyvinyl alcohol thereover. After thorough mixing and reduction to a particulate form in a motor driven blender, the blended absorbent material was once again baked in an oven at 250° F. for about 1 hour. On removal from the oven, the absorbent material was in the form of a large pancake.

Best results to date in making the absorbent material described herein have been obtained using polyvinyl alcohol sold under the trade designation ELVANOL by DuPont. Specifically, ELVANOL, a registered trademark of DuPont, is a water soluble, synthetic resin involving polymerization of vinyl acetate and 98.0-99.8 percent hydrolysis of the intermediate polyvinyl acetate to polyvinyl alcohol.

Absorption testing of the material was conducted in an open-top test cell filled to approximately 50% of capacity with tap water and maintained at 78° F. A preweighed sample of the sorbent material was placed in the test cell and left to stand for 0.5 hours. The sample was then removed from the cell, drained flat for 5 minutes and re-weighed. The water content in the recovered fluid was determined by normal separation and volume measurement, with volumes measured by a graduated cylinder.

Reuse testing of the sorbent material consisted of placing the material in a water sample having an oil layer (0.187 inches) on the surface. The sorbent sample was repeatedly tested until it either disintegrated or until the amount of test fluid recovered fell below 50% of the initial capacity. The test liquid was replenished after each trial to maintain the desired oil layer thickness.

For these reuse tests the sorbent was held within a textile "sock" which was immersed in the test fluid. The fluid was retrieved by locating the sock within an open top container having a foraminous bottom wall and pressing the fluid out which was collected in a further container under the first container. As the sorbent particle size was reduced, the oil absorption of 1 ounce samples of sorbent ranged from a minimum of 1.5 ounces to about 8.0 ounces maximum.

Although in the described example the cakelike dried slurry layer was saturated in polyvinyl alcohol, further tests have shown that satisfactory reduction of ability to absorb water for many purposes is provided to the sorbent by merely applying a spray of the alcohol sufficient to completely cover the layer with a thin film.

Although the invention has been described in connection with a preferred embodiment, it is understood that those skilled in the appertaining art may effect changes that come within the spirit of invention as disclosed and within the ambit of the appended claims.

What is claimed is:

1. Method of making an oil absorbent and water nonabsorbent material from organic fibrous paper, comprising the steps of:
   immersing the paper in water having a temperature about 212 degrees Fahrenheit until the paper fibers become broken down while simultaneously continuously stirring the paper and water mixture;
   removing excess water to leave a paper slurry;
   spreading the slurry in a uniformly thick layer onto an open top container;
   heating the slurry layer until the slurry assumes a dry solid condition;
   saturating the dried solid slurry layer with linseed oil;
   applying polyvinyl alcohol to the dried solid slurry layer; and
   heating the solid layer until the layer becomes thoroughly dried.

2. Method as in claim 1, in which the paper consists essentially of unglazed newsprint.

3. Method as in claim 1, in which the paper is in separate pieces approximately 2 inches by 3 inches.

4. Method as in claim 3, in which the pieces are immersed in the water separately and stirred while heating in the water to maintain them in separated condition.

5. Method as in claim 3, wherein the slurry layer has a thickness of approximately 0.25 inches before heating.

6. Method as in claim 1, in which the slurry layer is heated at approximately 250 degrees F. for about 1 hour.

7. Method as in claim 1, in which the polyvinyl alcohol is applied is such quantity as to saturate the dried solid layer.

8. Method as in claim 1, in which the polyvinyl alcohol is sprayed onto the dried solid layer completely covering the outer surface of the solid layer.

9. Method as in claim 1, in which the solid layer after heating is broken into relatively uniformly sized pieces.

10. Method as in claim 1, in which the solid layer after heating is frictionally cut into relatively uniformly sized pieces.

11. Method as in claim 1, in which the polyvinyl alcohol is fully hydrolyzed.

12. Method of making a sorbent material having the two principal attributes of relatively high oil absorption capability and relatively poor water absorption, which comprises:

forming unglazed organic fibrous paper into a plurality of separate sheetlike pieces;

adding the paper pieces in a separated manner to a quantity of boiling water sufficient to completely cover the paper pieces;

boiling the paper pieces in the water for about 0.5 hours while stirring continuously to form a viscous slurry;

removing the viscous slurry and leaving a remainder of water quantity;

forming the viscous slurry into a layer onto a flat surface;

baking the slurry layer at 250 degrees F. for about 1.0 hour to form a thoroughly dried cakelike layer;

pouring linseed oil over the dried cakelike layer in such quantity as to saturate the layer;

applying polyvinyl alcohol to the linseed oil saturated layer to at least cover the layer with a continuous film;

reducing the linseed oil saturated cakelike layer covered with alcohol into a plurality of pieces of generally uniform size; and baking the cakelike layer pieces at 250 degrees F. for about 1.0 hour.

13. Method as in claim 12, in which the baked cakelike layer is formed into a plurality of relatively uniformly sized pieces by non-frictional cutting.

14. Method as in claim 12, in which the polyvinyl alcohol is applied in sufficient quantity to saturate the layer.

15. Method of making an oil absorbent material which is non-absorbent of aqueous solutions, comprising the steps of:

breaking down a quantity of organic fibrous newsprint paper fibers and forming an aqueous slurry thereof;

baking the slurry until it assumes a hard dry cake;

saturating the hard dry cake with linseed oil;

applying a film of hydrolyzed polyvinyl alcohol completely covering the outer surface of the hard dry cake; and baking the saturated filmed cake to a hard dry condition.

16. Method as in claim 15, in which the hard dry saturated filmed cake is reduce to convenient sized particles.

* * * * *